(12) United States Patent
Wang et al.

(10) Patent No.: US 6,856,911 B2
(45) Date of Patent: Feb. 15, 2005

(54) PSEUDO-OFFSET MIGRATION

(75) Inventors: Weizhong Wang, Katy, TX (US); Long Don Pham, Houston, TX (US)

(73) Assignee: PGS Americas, Inc., Houston, TX (US)

( * ) Notice: Subject to any disclaimer, the term of this patent is extended or adjusted under 35 U.S.C. 154(b) by 0 days.

(21) Appl. No.: 09/876,910

(22) Filed: Jun. 8, 2001

(65) Prior Publication Data

US 2004/0024530 A1 Feb. 5, 2004

(51) Int. Cl.$^7$ ................................................ G01V 1/28
(52) U.S. Cl. ................................................ 702/14
(58) Field of Search ........................ 702/14, 16, 18; 367/73

(56) References Cited

U.S. PATENT DOCUMENTS 5,544,126 A * 8/1996 Berryhill .................... 367/52

6,178,381 B1 1/2001 Padhi et al.

FOREIGN PATENT DOCUMENTS

EP 1094339 11/2000

* cited by examiner

*Primary Examiner*—Donald McElheny, Jr.
(74) *Attorney, Agent, or Firm*—E. Eugene Thigpen (57) ABSTRACT

A method of migration of a seismic data is disclosed. The data include a data point having an input source location, an input receiver location, and a scatter point associated therewith. The method includes determining a projected source location, and determining a projected receiver location. The seismic data point is mapped from an input travel time to a projected travel time. A pseudo-offset is determined based on the projected travel time and the data point is mapped to the pseudo-offset.

41 Claims, 5 Drawing Sheets

| determining a pseudo-offset (110) |

| mapping a seismic trace to the image location (120) |

S: Input Source Location

R: Input Receiver Location

D: Scatter Point

I: Image Location $p_P$: Input Ray Parameter from Source S to Scatter Point D $p_S$: Input Ray Parameter from Scatter Point D to Receiver R $h_P$: Distance between Source S and Image Location I $h_S$: Distance between Receiver R and Image Location I

S*: Pseudo-Source

R*: Pseudo-Receiver

$p$: Pseudo Ray Parameter $x$: Pseudo-Offset

S: Input Source Location

R: Input Receiver Location

D: Scatter Point

I: Image Location $p_P$: Input Ray Parameter from Source S to Scatter Point D $p_S$: Input Ray Parameter from Scatter Point D to Receiver R

S': Projected Source Location

R': Projected Receiver Location $h_P'$: Distance between Projected Source S and Image Location I $h_S'$: Distance between Projected Receiver R and Image Location I

Figure 5

PSEUDO-OFFSET MIGRATION

BACKGROUND OF THE INVENTION

This invention relates to the field of seismic data acquisition and processing.

Converted-wave (C-wave) processing is more difficult than pure-mode processing. Those of the ordinary skill in the art will recognize that converted waves result from compressional waves (P-waves), which come into contact with a reflecting surface and incite a shear wave (S-wave). The opposite is also true. That is, an S-wave may also incite a P-wave. Because P-waves and S-waves have different characteristics, converted wave processing, which requires a set of characteristics for the down-going wave and a different set of characteristics for the up-going wave, is much more complicated than processing only a single set of characteristics for only P-wave data or S-wave data.

For example, accurate migration is critically dependent on both P-wave and S-wave velocities. Furthermore, conventional prestack time migration techniques, such as the industry standard of Kirchhoff migration, are normally based on the double-square root travel time equation. These methods assume a straight ray from the source to the scatter point and from the scatter point to the receiver. Other current Kirchhoff prestack time migration techniques are often implemented with a travel time approximation (Li et al., 2001). The straight ray assumption and the travel time approximation thus, limit the ability to produce an accurate subsurface image without a correction for ray bending and travel time errors. For multi-layered v(z) media or vertical transversely isotropic (VTI) media, more sophisticated travel time equations are needed.

Even further, another current prestack migration is equivalent-offset migration. Equivalent-offset migration (EOM) is a prestack time migration method proposed by Bancroft et al. (1998). Equivalent offset migration claims to be computationally efficient and weakly velocity-dependent. However, in C-wave processing, equivalent offset migration (Wang et al, 1996) depends on the initial velocity even for a single constant-velocity flat layer. Thus, EOM is poor for C-wave velocity analysis.

Finally, many current ocean bottom cable (OBC) techniques require wave-equation datumming. Wave equation datumming adds additional processing steps, increases cost, and causes irregular geometry effects on 3-D OBC data processing.

Thus, there is a long felt need for migration techniques which address one or any of the above issues.

SUMMARY OF THE INVENTION

In one example embodiment of the present invention, a method is provided for migrating an input seismic data point having an input source location, an input receiver location, and an image location associated therewith. The method comprises determining a pseudo-offset, and mapping the seismic data point to the image location based at least in part on the pseudo-offset.

In a further example embodiment of the present invention, a method is provided for migration of a seismic data point having an input source location, an input receiver location, and a scatter point associated therewith. The method comprises determining a projected source location and determining a projected receiver location. The method further comprises mapping the seismic data point from the input travel time to a projected travel time. The method also comprises determining a pseudo-offset based at least in part on the projected travel time, and mapping the data point to the pseudo-offset.

In an even further example embodiment of the present invention, a method of performing velocity analysis on a seismic gather is provided. The method comprises computing a moveout travel time based on an initial model and computing an intermediate travel time. The method further comprises mapping the gather from the moveout travel time to the intermediate travel time, and scanning for velocities based on the intermediate travel time.

In an even further embodiment, a system is provided for migrating an input seismic data point having an input source location and an input receiver location, a scatter point, and an image location associated therewith. The system comprises means for determining a pseudo-offset, and means for mapping the seismic data point to the image location based at least in part on the pseudo-offset.

In an even further embodiment, a system is provided for migration of a seismic data point having an input source location, an input receiver location, and a scatter point associated therewith. The system comprises means for determining a projected source location, means for determining a projected receiver location, means for mapping the seismic data point from an input travel time to a projected travel time, means for determining a pseudo-offset based on the projected travel time, and means for mapping the data point to the pseudo-offset.

In an even further embodiment, a system for performing velocity analysis on a seismic gather is provided. The system comprises means for computing a moveout travel time based on an initial model, means for computing an intermediate travel time, means for mapping the gather from the moveout travel time to the intermediate travel time, and means for scanning for velocities based on the intermediate travel time.

In an even further embodiment, a seismic data point is provided. The seismic data point is produced by the process of migration comprising determining a pseudo-offset, and mapping the seismic data point to the image location based at least in part on the pseudo-offset.

In an even further embodiment, a seismic data point is provided. The seismic data point is produced by a method of migration comprising determining a projected source location, determining a projected receiver location, mapping the seismic data point from the input travel time to a projected travel time, determining a pseudo-offset based on the projected travel time, and mapping the data point to the pseudo-offset.

DETAILED DESCRIPTION OF EXAMPLE EMBODIMENTS OF THE INVENTION

Those of ordinary skill in the art will appreciate that for the purpose of teaching the broad aspect of the present invention, example embodiments of the invention are described in detail.

Figure 1:
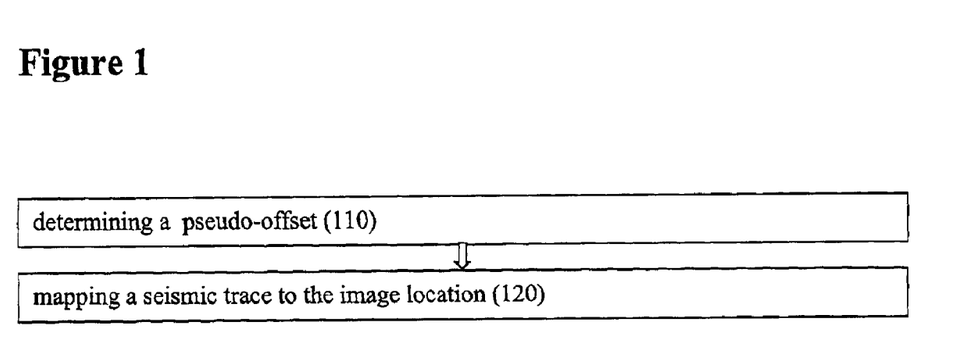
FIG. 1 is a diagram outlining an example embodiment of the present invention.
Figure 2:
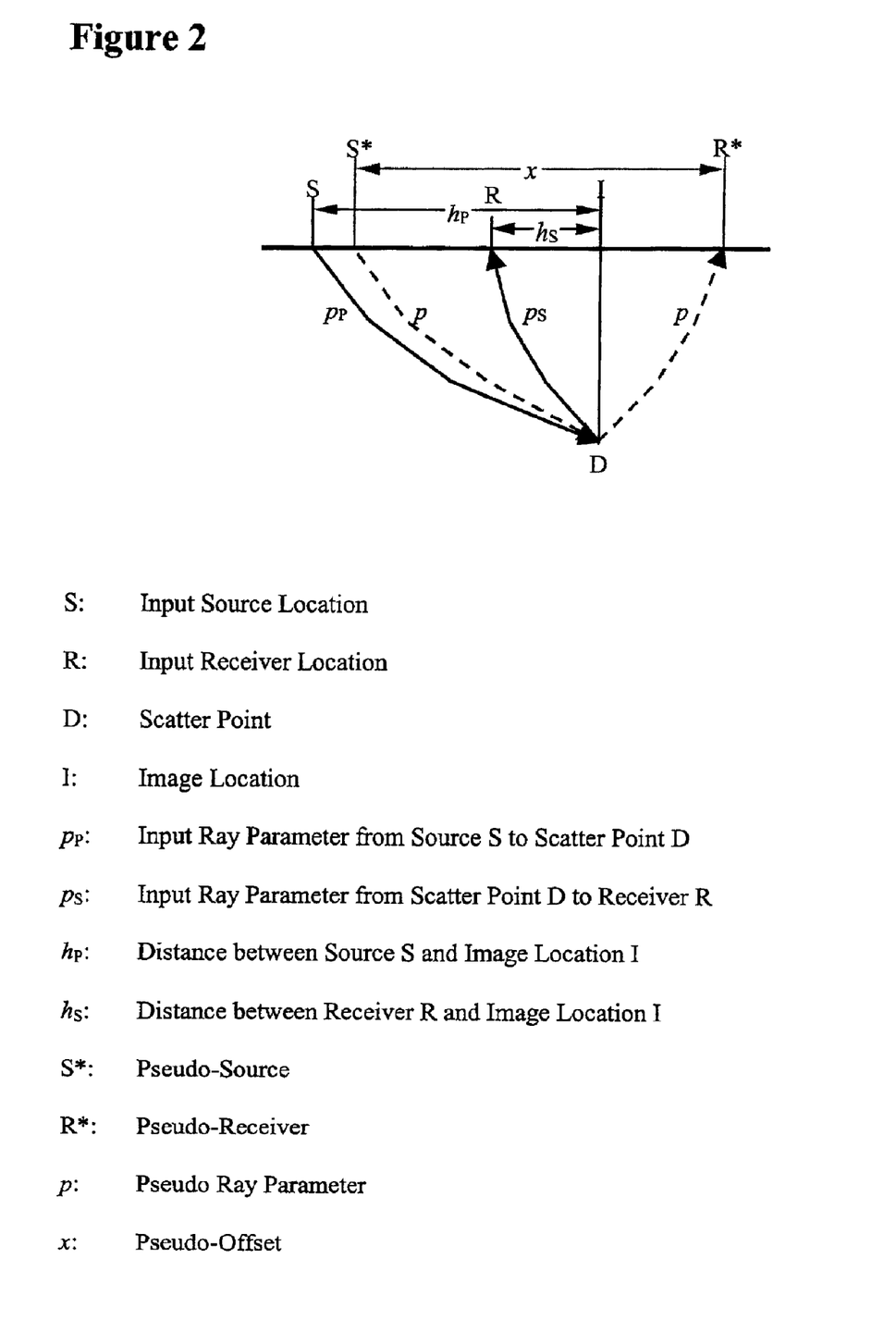
FIG. 2 is a schematic diagram demonstrating features of an example embodiment of the present invention.

As illustrated by reading FIGS. 1 and 2 in conjunction, in one example embodiment of the present invention, a method of migrating seismic data is provided. In alternate embodiments the content and acquisition situation of the seismic data to be migrated is land data, dual sensor data, streamer data, VSP data, vertical cable data, or any other data from any other acquisition situation that will occur to those of ordinary skill in the art. In a further embodiment, the seismic data comprises an input seismic data point having an input source location S and an input receiver location R. Those of ordinary skill in the art will recognize that such information is often available on the trace headers or geometry database. The method comprises determining (110) a pseudo-offset x and mapping (120) the seismic data point to the image location I based at least in part on the pseudo-offset x. In an even further embodiment, the method further comprises determining a pseudo-source S* and a pseudo-receiver R*. In still a further embodiment, the pseudo-source S* and the pseudo-receiver R* are not collocated. In an even further embodiment, the pseudo-offset x comprises a distance between the pseudo-source S* and the image location I plus a distance between the pseudo-receiver R* and the image location I. In still an even further embodiment, the method further comprises determining a pseudo ray parameter p. In an even further embodiment, determining a pseudo ray parameter p further comprises determining a pseudo ray parameter p which is constant from the pseudo-source S* to the scatter point D and from the scatter point D to the pseudo-receiver R*. In still a further embodiment, determining a pseudo-offset x further comprises determining a travel time associated with the input source location S and the input receiver location R and the scatter point D. In an even further embodiment, determining a pseudo-offset x further comprises determining a pseudo travel time from the pseudo-source S* to the pseudo-receiver R* via the scatter point D. In an even further embodiment, the pseudo travel time and the actual travel time from the input source location S to the input receiver location R are essentially equivalent.

In a further example embodiment of the present invention, a method of migrating seismic data is developed for multi-layered v(z) isotropic media. To demonstrate this we begin with the basic Kirchhoff integral for C-wave prestack time migration. The Kirchhoff integral is formulated as the following summation, $$output(t_{C0}) = \sum_{aperture} amplitude\,[filter * input(t)], \quad (1)$$

where t is the input travel time which is the sum of the P-wave travel time $t_P$ from a source S to a scatter point D and the S-wave travel time $t_S$ from the scatter point D to a receiver R as illustrated in FIG. 2. The travel time is, $$t = t_P + t_S. \quad (2)$$

$t_{C0}$ is the C-wave vertical travel time which is the sum of the P-wave vertical travel time $t_{P0}$ and the S-wave vertical travel time $t_{S0}$, $$t_{C0} = t_{P0} + t_{S0}. \quad (3)$$

In one embodiment, for the v(z) media, $t_P$ is computed from the following equation (Slotnick 1959), $$t_P(p_P) = \int_0^{\tau_{P0}} \frac{d\tau_P}{\sqrt{1 - p_P^2 v_P^2(\tau_P)}}, \quad (4)$$

where $v_P(\tau_P)$ is the P-wave interval velocity, and $p_P$ is a ray parameter from the source S to the scatter point D, which is solved from the following equation, $$\int_0^{\tau_{P0}} \frac{p_P v_P^2(\tau_P) d\tau_P}{\sqrt{1 - p_P^2 v_P^2(\tau_P)}} = h_P, \quad (5)$$

where $h_P$ is the horizontal distance between the source S and the scatter point D. Similarly, in a further embodiment, $t_S$ is computed from the following equation, $$t_S(p_S) = \int_0^{\tau_{S0}} \frac{d\tau_S}{\sqrt{1 - p_S^2 v_S^2(\tau_S)}}, \quad (6)$$

where $v_S(\tau_S)$ is the S-wave interval velocity, and $p_S$ is a ray parameter from the scatter point D to the receiver R, which is solved from the following equation, $$\int_0^{\tau_{S0}} \frac{p_S v_S^2(\tau_S) d\tau_S}{\sqrt{1 - p_S^2 v_S^2(\tau_S)}} = h_S, \quad (7)$$

where $h_S$ is the horizontal distance between the scatter point D and the receiver R. To replace $t_{P0}$ and $t_{S0}$ with $t_{C0}$ in equations above, let $$\tau = \tau_P + \tau_S, \quad (8)$$

and define the interval vertical travel time ratio as $$\gamma_0(\tau) = d\tau_S/d\tau_P. \quad (9)$$

For the isotropic medium, $\gamma_0(\tau)$ is equal to the interval velocity ratio, that is $$v_P(\tau_P)/v_S(\tau_S) = \gamma_0(\tau). \quad (10)$$

In another example embodiment, we then use the C-wave interval velocity $v_C(\tau)$ defined by Thomsen (1999), $$v_C^2(\tau) = \frac{v_P^2(\tau_P) d\tau_P + v_S^2(\tau_S) d\tau_S}{d\tau}, \quad (11)$$

to replace velocities $v_P(\tau_P)$ and $v_S(\tau_S)$. By substituting $t_{P0}$, $t_{S0}$, $v_P$, and $v_S$ with $t_{C0}$, $v_C$, and $\gamma_0$ in the travel time equations (4)–(7), $t_P$ and $t_S$ is computed using the following equations, $$t_P(p_P) = \int_0^{\tau_{C0}} \frac{\frac{1}{1+\gamma_0(\tau)} d\tau}{\sqrt{1 - \gamma_0(\tau) p_P^2 v_C^2(\tau)}}, \quad (12)$$

$$\int_0^{\tau_{C0}} \frac{\frac{\gamma_0(\tau)}{1+\gamma_0(\tau)} p_P v_C^2(\tau) d\tau}{\sqrt{1 - \gamma_0(\tau) p_P^2 v_C^2(\tau)}} = h_P, \quad (13)$$

$$t_S(p_S) = \int_0^{\tau_{CO}} \frac{\frac{\gamma_0(\tau)}{1+\gamma_0(\tau)} d\tau}{\sqrt{1 - \frac{1}{\gamma_0(\tau)} p_S^2 v_C^2(\tau)}}, \quad (14)$$

$$\int_0^{\tau_{CO}} \frac{\frac{1}{1+\gamma_0(\tau)} p_S v_C^2 d\tau}{\sqrt{1 - \frac{1}{\gamma_0(\tau)} p_S^2 v_C^2(\tau)}} = h_S. \quad (15)$$

In an even further embodiment, for the isotropic media, we only need to know $t_{CO}$, $v_C$, and $\gamma_0$ to compute $t_P$ and $t_S$. Unlike conventional techniques, no effective velocity ratio $\gamma_{\text{eff}}$ (Thomsen, 1999) is required. In alternate embodiments, the interval vertical travel time ratio $\gamma_0$ is determined directly from the travel time ratio of corresponding C-wave and P-wave events such as on stacks or extrapolated from oblique times on prestack gathers.

In an even further embodiment, instead of performing the Kirchhoff summation directly as is done in conventional migration, we divide the Kirchhoff summation into two steps. The first step is to map each input sample to a new geometry, such that, two conditions are met. The first condition is that the travel time from the new source S* (called the pseudo-source) to the new receiver R* (called the pseudo-receiver) is essentially the same as the travel time computed from the input geometry of the input source location S and the input receiver location R, as illustrated in FIG. 2. The second condition is the ray parameter from the new pseudo-source S* to the scatter point D is essentially the same as the ray parameter from the scatter point D to the new pseudo-receiver R.* We call the new ray parameter the pseudo ray parameter p. In a further embodiment, the pseudo ray parameter p is computed from the following equations, $$t = t_P(p_P) + t_S(p_S), \quad (16)$$

$$t^*(p) = t, \quad (17)$$

$$t^*(p) = t_P(p) + t_S(p), \quad (18)$$

where t* is the new travel time from the pseudo-source to the pseudo-receiver and is called the pseudo travel time. As illustrated in FIG. 2, the distance between the pseudo-source S* and the image location I plus the distance between the pseudo-receiver R* and the image location I is called the pseudo-offset x. In an even further embodiment, with the estimated pseudo ray parameter p, the pseudo-offset x is computed as follows $$x = \int_0^{\tau_{CO}} \left[ \frac{\gamma_0(\tau)}{\sqrt{1 - \gamma_0(\tau) p^2 v_C^2(\tau)}} + \frac{1}{\sqrt{1 - \frac{1}{\gamma_0(\tau)} p^2 v_C^2(\tau)}} \right] \frac{p v_C^2(\tau) d\tau}{1+\gamma_0(\tau)}. \quad (19)$$

For a given scatter point D, the input samples inside the migration aperture are accumulated to different pseudo-offsets x based on the equations (16)–(19). Thus, a common-scatter point gather or POM gather is created. We call the first step migration mapping. The second step of this migration scheme is to perform moveout correction based on equation (18) and stack the POM gather along the pseudo travel time. We call the second step migration stacking.

In an even further embodiment, the pseudo-offset migration method is employed in the ocean-bottom cable (OBC) acquisition situation. The OBC option assumes the elevation difference between shots and receivers and performs the migration without wave-equation datuming (Berryhill, 1979). For the OBC data migration, we assume the velocity function is referenced at the sea level where shots are normally located, so $t_P$ is still computed based on equations (12)–(13). However, in an even further embodiment of the present invention, the computation for $t_S$ is redefined. Assuming $d_r$ is the receiver depth, $v_w$ is the P-wave replacement velocity or the water velocity, and $\gamma_w$ is a replacement value for the shallow $\gamma_0$, equations (14) and (15) are replaced by $$t_S(p_S) = \int_0^{\tau_{CO}} \frac{\frac{\gamma_0(\tau)}{1+\gamma_0(\tau)} d\tau}{\sqrt{1 - \frac{1}{\gamma_0(\tau)} p_S^2 v_C^2(\tau)}} - \frac{\gamma_w d_r}{v_w \sqrt{1 - \frac{p_S^2 v_w^2}{\gamma_w^2}}}. \quad (20)$$

$$\int_0^{\tau_{CO}} \frac{\frac{1}{1+\gamma_0(\tau)} p_S v_C^2(\tau) d\tau}{\sqrt{1 - \frac{1}{\gamma_0(\tau)} p_S^2 v_C^2(\tau)}} - \frac{p_S v_w d_r}{\gamma_w \sqrt{1 - \frac{p_S^2 v_w^2}{\gamma_w^2}}} = h_S. \quad (21)$$

Those of ordinary skill in the art will recognize that in alternate embodiments, pseudo-offset migration is still performed based on equations (16)–(18). In an even further embodiment, the pseudo-offset migration method is employed for OBC, vertical cable, VSP, or land data migration or any other acquisition situation that will occur to those of ordinary skill in the art.

Figure 3:
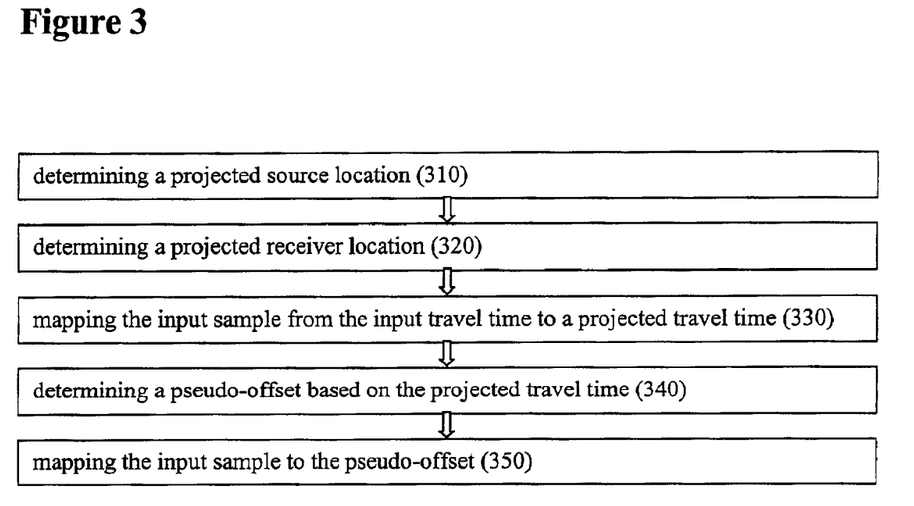
FIG. 3 is a diagram outlining an example embodiment of the present invention.
Figure 4:
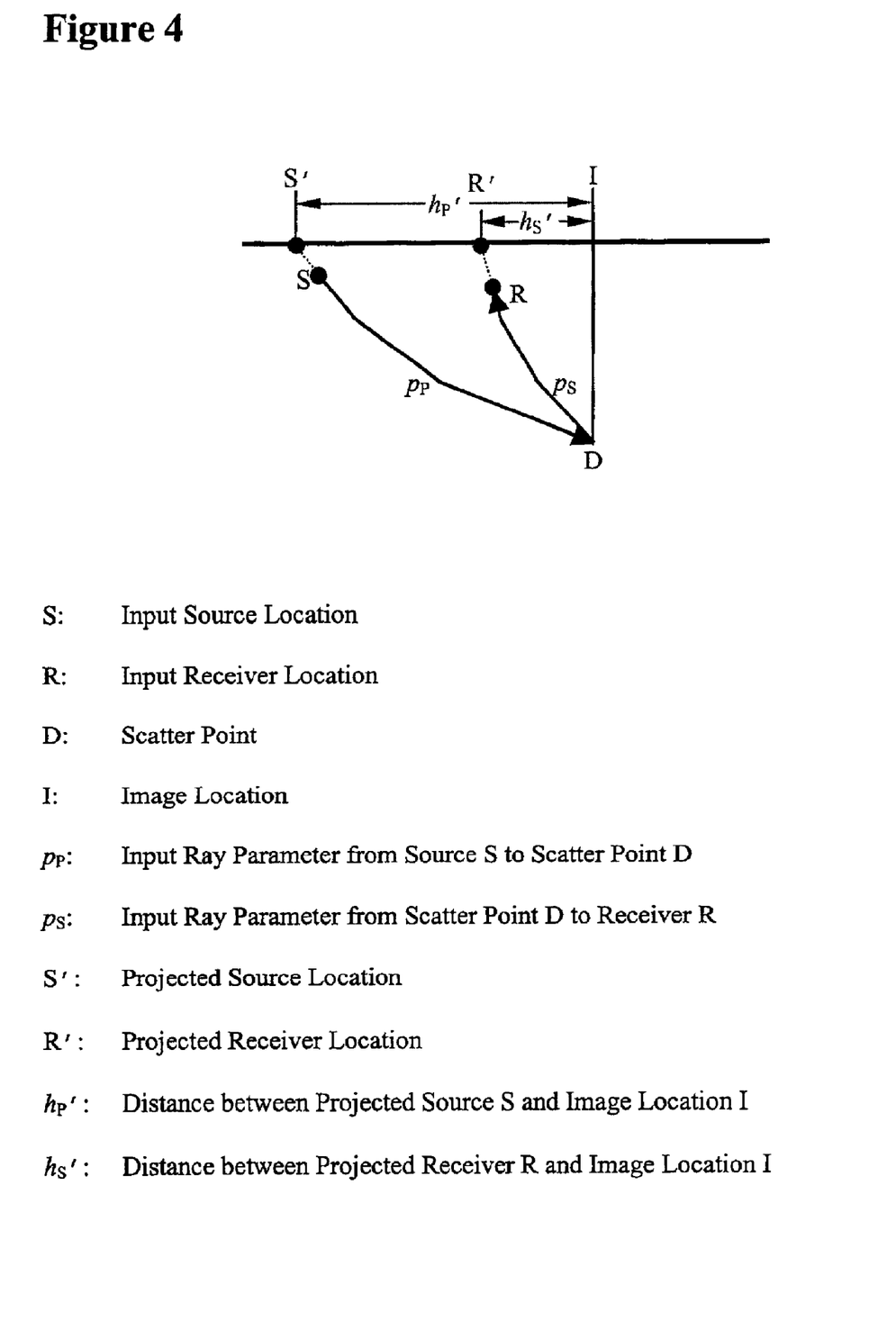
FIG. 4 is a schematic diagram demonstrating features of an example embodiment of the present invention.

Turning now to FIGS. 3 and 4 in conjunction, a further example embodiment of the present invention is presented. A method of migrating a seismic data point having an input source location, an input receiver location, and a scatter point associated therewith is provided. The method comprises determining (310) a projected source location S', determining (320) a projected receiver location R', mapping (330) the input seismic data point from the input travel time t to a projected travel time t', determining (340) a pseudo-offset x based on the projected travel time t', and mapping (350) the input sample to the pseudo-offset. In alternate embodiments, the projected source location S' and/or the projected receiver location R' are unmoved, or essentially equivalent, to the input source location S and the input receiver location R. In even further alternate embodiments, the projected source location S' and the projected receiver location R' are projected along the raypath of the input source location S to the scatter point D to the input receiver location R. In a further embodiment, the projected source location S' is controlled by the ray parameter $p_P$ which is solved from equation, $$\int_0^{\tau_{CO}} \frac{\frac{\gamma_0(\tau)}{1+\gamma_0(\tau)} p_P v_C^2(\tau) d\tau}{\sqrt{1 - \gamma_0(\tau) p_P^2 v_C^2(\tau)}} - \frac{p_P v_w d_s}{\sqrt{1 - p_P^2 v_w^2}} = h_P, \quad (22)$$

where the C-wave interval velocity $v_C(\tau)$ is referenced at a datum (401) and $d_s$ is the distance from the source location S to the datum (401). In an even further embodiment, the projected receiver location R' is controlled by the ray parameter $p_S$ which is solved from equation (21) where $d_r$ is the distance from the receiver location R to the datum (401). In yet a further embodiment, with $p_P$ and $p_S$, the input travel time are computed as $$t = \int_0^{t_{CO}} \frac{\frac{1}{1+\gamma_0(\tau)} d\tau}{\sqrt{1-\gamma_0(\tau)p_P^2 v_C^2(\tau)}} - \frac{d_s}{v_w\sqrt{1-p_P^2 v_w^2}} + \int_0^{t_{CO}} \frac{\frac{\gamma_0(\tau)}{1+\gamma_0(\tau)} d\tau}{\sqrt{1-\frac{1}{\gamma_0(\tau)}p_S^2 v_C^2(\tau)}} - \frac{\gamma_w d_r}{v_w\sqrt{1-\frac{p_S^2 v_w^2}{\gamma_w^2}}}. \quad (23)$$

In still a further embodiment, the projected travel time from S' to D and from D to R' is determined by $$t' = \int_0^{t_{CO}} \frac{\frac{1}{1+\gamma_0(\tau)} d\tau}{\sqrt{1-\gamma_0(\tau)p_P^2 v_C^2(\tau)}} + \int_0^{t_{CO}} \frac{\frac{\gamma_0(\tau)}{1+\gamma_0(\tau)} d\tau}{\sqrt{1-\frac{1}{\gamma_0(\tau)}p_S^2 v_C^2(\tau)}}. \quad (24)$$

The input sample point is mapped from t to t'. In an even further embodiment, the pseudo ray parameter p is determined by $$t^*(p) = t'. \quad (25)$$

In yet another example embodiment, the pseudo-offset is computed with equation (19).

Those of ordinary skill in the art will recognize that the amplitude term in equation (1) contains both the spherical divergence recovery and the obliquity factor (Yilmaz, 1987). The filter term in equation (1) represents several functions in alternate embodiments. The first function is that of a bandpass filter. The second function is that it performs statics correction. The third function is that it operates as a derivative filter, which performs the first-order derivative filtering for 3-D data and the half-order derivative filtering for 2-D data (Yilmaz, 1987). The last function is that it operates as an antialiasing filter. The antialiasing filter is designed for each input/output trace pair. To apply the antialiasing for each input/output pair, even the 3-point triangle filter (Lumley et al., 1994) will increase the migration runtime significantly. In alternate embodiments, to cut the cost and still reject the aliasing noise, an amplitude weighting technique is developed. The weighting coefficients are defined as follows, $$w = \frac{V_{C2}^2 t \Delta t}{4 r \Delta r}, \quad (26)$$

where $\Delta t$ is the sample interval, r is the migration radius which is the distance from the conversion point (C-wave) or midpoint (P-wave) to the scatter point, $\Delta r$ is the sample interval of the migration radius, and $V_{C2}$ is the C-wave short-spread moveout velocity.

In another example embodiment of the present invention, a method of migrating seismic data is developed for vertical transversely isotropic (VTI) media. The exact travel times are implemented for C-wave Kirchhoff prestack time migration:

$$t = t_P + t_S. \quad (27)$$

For v(z) vertical transverse isotropy (VTI) media, we have the following equations:

$$t_P = \sum_{i=1}^n \frac{\Delta t_{P0i} v_{P0i} / v_{Pi}(p_P, v_{P0i}, v_{S0i}, \varepsilon_i, \delta_i)}{\sqrt{1 - p_P^2 v_{Pi}^2(p_P, v_{P0i}, v_{S0i}, \varepsilon_i, \delta_i)}}, \quad (28)$$

$$t_S = \sum_{i=1}^n \frac{\Delta t_{S0i} v_{S0i} / v_{Si}(p_S, v_{P0i}, v_{S0i}, \varepsilon_i, \delta_i)}{\sqrt{1 - p_S^2 v_{Si}^2(p_S, v_{P0i}, v_{S0i}, \varepsilon_i, \delta_i)}}, \quad (29)$$

$$h_P = \sum_{i=1}^n \frac{p_P v_{Pi}(p_P, v_{P0i}, v_{S0i}, \varepsilon_i, \delta_i) v_{P0i} \Delta t_{P0i}}{\sqrt{1 - p_P^2 v_{Pi}^2(p_P, v_{P0i}, v_{S0i}, \varepsilon_i, \delta_i)}}, \quad (30)$$

$$h_S = \sum_{i=1}^n \frac{p_S v_{Si}(p_S, v_{P0i}, v_{S0i}, \varepsilon_i, \delta_i) v_{S0i} \Delta t_{S0i}}{\sqrt{1 - p_S^2 v_{Si}^2(p_S, v_{P0i}, v_{S0i}, \varepsilon_i, \delta_i)}}, \quad (31)$$

where $h_P$ and $h_S$ are the horizontal distance from the source/receiver to the scatter point, $p_P$ and $p_S$ are the P- and S-wave ray parameters, $\Delta t_{P0i}$ and $\Delta t_{S0i}$ are the vertical-travel-times in the i-th layer, $v_{P0i}$ and $v_{S0i}$ are the vertical velocities of the i-th layer, and $v_{Pi}$ and $v_{Si}$ are the group velocities. In a further embodiment, based on the work of Thomsen (1986), we derive the group velocities as a function of $p_P/p_S$, $v_{P0i}$, $v_{S0i}$, $\varepsilon_i$ and $\delta_i$ numerically. The ray parameters in equations (28)–(29) are not time-variant, and $h_P$ and $h_S$ are constant for a given scatter point, so we numerically solve equations (30) and (31) for $p_P$ and $p_S$. To compute travel times $t_P$ and $t_S$, we still need to know $\Delta t_{P0i}$, $\Delta t_{S0i}$, $v_{P0i}$, $v_{S0i}$, $\varepsilon_i$ and $\delta_i$. Parameters $\Delta t_{S0i}$ and $v_{S0i}$ are not be measured or estimated directly from P-wave and C-wave data. In a further embodiment, we replace them by the C-wave vertical-travel-time $$\Delta t_{C0i} = \Delta t_{P0i} + \Delta t_{S0i}, \quad (32)$$

and the interval vertical-travel-time ratio, that is the same as the vertical-velocity-ratio for the i-th layer, $$\gamma_{0i} = \Delta t_{S0i} / \Delta t_{P0i} = v_{P0i} / v_{S0i}. \quad (33)$$

In a further embodiment, with equations (32) and (33), $\Delta t_{P0i}$ is also replaced by $\Delta t_{C0i}$ and $\gamma_{0i}$. Velocity $v_{P0i}$ is determined from P-wave short-spread moveout velocity $v_{P2i}$, but the P-wave velocity is indexed at P-wave times and is mapped to C-wave times using $\gamma_{0i}$. In a further embodiment, parameter $\gamma_{0i}$ is determined by correlating corresponding P-wave and C-wave events from stacked sections or near-offsets of prestack gathers and it is unavoidable with errors. P-wave velocity $v_{P2i}$ often has its own error. If the P-wave velocity error is propagated through $\gamma_{0i}$ to C-wave migration, it is more difficult to take it out without joint processing of both P- and C-wave data. Alternatively, a C-wave velocity is used to control the C-wave migration. In still a further embodiment, using the definition of the C-wave interval velocity of Thomsen (1999), $$v_{Ci}^2 = \frac{v_{P2i}^2}{1 + \gamma_{0i}} + \frac{v_{S2i}^2}{1 + 1/\gamma_{0i}}, \text{ where} \quad (34)$$

$$v_{P2i}^2 = v_{P0i}^2 (1 + 2\delta_i), \quad (35)$$

$$v_{S2i}^2 = v_{S0i}^2 (1 + 2\sigma_i), \quad (36)$$

$$\sigma_i = \gamma_{0i}^2 (\varepsilon_i - \delta_i), \quad (37)$$

we replace $v_{P0i}$ and $v_{S0i}$ with $v_{Ci}$, $\gamma_{0i}$, $\varepsilon_i$ and $\delta_i$. Thus, the total diffraction travel time is accurately computed with four parameters $v_{Ci}$, $\gamma_{0i}$, $\varepsilon_i$ and $\delta_i$ at a given C-wave vertical-travel-time $t_{C0}$.

In various embodiments, we do not have $\gamma_{eef}$ (Thomsen, 1999) which requires P-wave velocities. The v(z) effect in travel times is reflected in the interval velocity $v_{Ci}$ and the interval $\gamma_{0i}$. The VTI effect is reflected in anisotropic parameters $\epsilon_i$ and $\delta_i$ directly.

The exact travel time computation does not increase the migration runtime much because for prestack time migration, a small travel timetable is built at each scatter point and it does not change with the input traces.

In an even further embodiment, the following equations are used to compute the pseudo-offset for the C-wave migration of VTI v(z) media $$t = t_P(p_P) + t_S(p_S), \tag{38}$$

$$t^*(p) = t, \tag{39}$$

$$t^*(p) = t_P(p) + t_S(p), \tag{40}$$

$$x = h_P(p) + h_S(p), \tag{41}$$

Those of ordinary skill in the art will recognize that the pseudo travel time t* is no longer hyperbolic. Therefore, velocity analysis based on the pseudo travel time equation becomes complicated.

Figure 5:
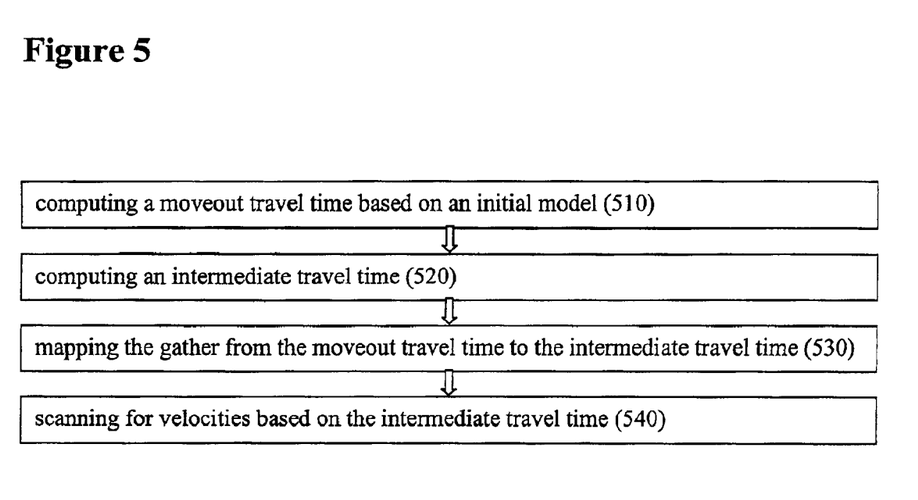
FIG. 5 is a diagram outlining an example embodiment of the present invention.

In an even further embodiment, a method of performing velocity analysis is provided. As illustrated in FIG. 5, the method comprises computing (510) a moveout travel time based on an initial model, computing (520) an intermediate travel time, mapping (530) a gather from the moveout travel time to the intermediate travel time, and scanning (540) or velocities based on the intermediate travel time.

In even further alternate embodiments, the gather for velocity analysis is a pseudo-offset gather, a migration image gather, a CDP gather, or a CCP gather or any other seismic gather that will occur to those of ordinary skill in the art.

In further alternate embodiments, computing (510) a moveout travel time is based on a simple straight ray, a complicated ray tracing algorithm for VTI v(z) media, or any other travel time algorithm that will occur to those of ordinary skill in the art.

In an even further embodiment, computing (520) an intermediate travel time is based on an equation which has a scannable parameter for the final velocity. In further alternate embodiments, the scannable parameter is a P-wave velocity, an S-wave velocity, a C-wave velocity for converted waves or any other scannable parameter that will occur to those of ordinary skill in the art.

In one example embodiment of the present invention, the method for C-wave velocity analysis of v(z) VTI media comprises computing the moveout travel time based on equation (40) using initial model parameters and computing the intermediate travel time based on following equation:

$$t^2 = t_{C0}^2 + \frac{x^2}{V_{C2}^2}\left(1 - \frac{Ax^2}{t_{C0}^2 + \frac{Ax^2}{1 - \frac{1}{\gamma_0}}}\right), \quad A = \frac{(\gamma_0 - 1)^2}{4\gamma_0 V_{C2}^2}, \tag{42}$$

where $\gamma_0$ is the average vertical travel time ratio and $V_{C2}$ is a scannable velocity parameter. The final C-wave interval velocity $v_{Ci}$ is determined from $V_{C2}$ based on the following Dix formula:

$$v_{Ci}^2 = \frac{t_{C0i} V_{C2}^2(t_{C0i}) - t_{C0i-1} V_{C2}^2(t_{C0i-1})}{t_{C0i} - t_{C0i-1}}. \tag{43}$$

In various example embodiments discussed above, travel times, pseudo travel times, moveout travel times, projected travel times, have been computed using various algorithms. It will occur to those of ordinary skill in the art that travel times used in the present invention may be determined using any of the various travel time algorithms that will occur to those of ordinary skill in the art.

In a further embodiment, a system is provided for migrating an input seismic data point having an input source location and an input receiver location, a scatter point, and an image location associated therewith. The system comprises means for determining a pseudo-offset. In alternate embodiments, means for determining a pseudo-offset comprise a computer, a workstation, or software running on any computer, or any other means that will occur to those of ordinary skill in the art. The method further comprises means for mapping the seismic data point to the image location based at least in part on the pseudo-offset. In alternate embodiments, means for mapping comprise a computer, a workstation, or software running on any computer, or any other means that will occur to those of ordinary skill in the art.

In an even further embodiment, the system further comprises means for determining a pseudo-source and a pseudo-receiver. In alternate embodiments, means for determining a pseudo-source and a pseudo-receiver comprise a computer, a workstation, or software running on any computer, or any other means that will occur to those of ordinary skill in the art.

In an even further embodiment, the system further comprises means for determining a pseudo ray parameter. In alternate embodiments, means for determining a pseudo ray parameter comprise a computer, a workstation, or software running on any computer, or any other means that will occur to those of ordinary skill in the art.

In still a further embodiment, said means for determining a pseudo ray parameter further comprises means for determining a pseudo ray parameter dependant at least in part upon the ray parameter down from the input source location to the scatter point and the ray parameter up from the scatter point to the input receiver location. In alternate embodiments, means for determining a pseudo ray parameter comprise a computer, a workstation, or software running on any computer, or any other means that will occur to those of ordinary skill in the art.

In yet a further embodiment, said means for determining a pseudo-offset further comprises means for determining an input travel time associated with the input source location, the input receiver location, and the scatter point. In alternate embodiments, means for determining an input travel time comprise a computer, a workstation, or software running on any computer, or any other means that will occur to those of ordinary skill in the art.

In a further embodiment, means for determining a pseudo-offset further comprises means for determining a pseudo travel time from the pseudo-source to the pseudo-receiver via the scatter point. In alternate embodiments, means for determining a pseudo travel time comprise a computer, a workstation, or software running on any computer, or any other means that will occur to those of ordinary skill in the art.

In a further embodiment, the system further comprises a means for migration stacking. In alternate embodiments, means for migration stacking comprise a computer, a workstation, or software running on any computer, or any other means that will occur to those of ordinary skill in the art.

In a further embodiment, said means for migration stacking further comprises means for determining a moveout travel time. In alternate embodiments, means for determining a moveout travel time comprise a computer, a workstation, or software running on any computer, or any other means that will occur to those of ordinary skill in the art.

In still a further embodiment, the system further comprises means for summing the data point along the moveout travel time. In alternate embodiments, means for summing comprise a computer, a workstation, or software running on any computer, or any other means that will occur to those of ordinary skill in the art.

In a further embodiment a system is provided for migration of a seismic data point having an input source location, an input receiver location, and a scatter point associated therewith. The system comprises means for determining a projected source location. In alternate embodiments, means for determining a projected source location comprise a computer, a workstation, or software running on any computer, or any other means that will occur to those of ordinary skill in the art. The system further comprises means for determining a projected receiver location. In alternate embodiments, means for determining a projected receiver location comprise a computer, a workstation, or software running on any computer, or any other means that will occur to those of ordinary skill in the art. The system further comprises means for mapping the seismic data point from an input travel time to a projected travel time. In alternate embodiments, means for mapping comprise a computer, a workstation, or software running on any computer, or any other means that will occur to those of ordinary skill in the art. The system further comprises means for determining a pseudo-offset based on the projected travel time. In alternate embodiments, means for determining a pseudo-offset comprise a computer, a workstation, or software running on any computer, or any other means that will occur to those of ordinary skill in the art. The system further comprises means for mapping the data point to the pseudo-offset. In alternate embodiments, means for mapping comprise a computer, a workstation, or software running on any computer, or any other means that will occur to those of ordinary skill in the art.

In an even further embodiment, the system further comprises means for determining a raypath from said input source location to said input receiver location. In alternate embodiments, means for determining a raypath comprise a computer, a workstation, or software running on any computer, or any other means that will occur to those of ordinary skill in the art.

In still a further embodiment, said means for determining a projected receiver location further comprises means for determining a projected receiver location along the determined raypath. In alternate embodiments, means for determining a projected receiver location along the determined raypath comprise a computer, a workstation, or software running on any computer, or any other means that will occur to those of ordinary skill in the art.

In a further embodiment, said means for determining a projected source location further comprises means for determining a projected source location along the determined raypath. In alternate embodiments, means for determining a projected source location along the determined raypath comprise a computer, a workstation, or software running on any computer, or any other means that will occur to those of ordinary skill in the art.

In yet a further embodiment, the system further comprises means for determining a pseudo-source and a pseudo-receiver. In alternate embodiments, means for determining a pseudo-source and a pseudo-receiver comprise a computer, a workstation, or software running on any computer, or any other means that will occur to those of ordinary skill in the art.

In still a further embodiment, the system further comprises means for determining a pseudo ray parameter. In alternate embodiments, means for determining a pseudo ray parameter comprise a computer, a workstation, or software running on any computer, or any other means that will occur to those of ordinary skill in the art.

In an even further embodiment, said means for determining a pseudo-offset further comprises means for determining a projected travel time associated with the projected source location, the projected receiver location, and the scatter point. In alternate embodiments, means for determining a projected travel time comprise a computer, a workstation, or software running on any computer, or any other means that will occur to those of ordinary skill in the art.

In an even further embodiment, means for determining a pseudo-offset further comprises means for determining a pseudo travel time from a pseudo-source to a pseudo-receiver via the scatter point. In alternate embodiments, means for determining a pseudo travel time from a pseudo-source to a pseudo-receiver via the scatter point comprise a computer, a workstation, or software running on any computer, or any other means that will occur to those of ordinary skill in the art.

In an even further embodiment, the system further comprises means for migration stacking. In alternate embodiments, means for migration stacking comprise a computer, a workstation, or software running on any computer, or any other means that will occur to those of ordinary skill in the art.

In an even further embodiment, said means for migration stacking further comprises means for determining a moveout travel time. In alternate embodiments, means for determining a moveout travel time comprise a computer, a workstation, or software running on any computer, or any other means that will occur to those of ordinary skill in the art.

In yet a further embodiment, the system further comprises means for summing the data point along the moveout travel time. In alternate embodiments, means for summing comprise a computer, a workstation, or software running on any computer, or any other means that will occur to those of ordinary skill in the art.

In still a further embodiment, a system for performing velocity analysis on a seismic gather is provided. The system comprises means for computing a moveout travel time based on an initial model. In alternate embodiments, means for computing a moveout travel time based on an initial model comprise a computer, a workstation, or software running on any computer, or any other means that will occur to those of ordinary skill in the art. The system further comprises means for computing an intermediate travel time. In alternate embodiments, means for computing an intermediate travel time comprise a computer, a workstation, or software running on any computer, or any other means that will occur to those of ordinary skill in the art. The system further comprises means for mapping the gather from the moveout travel time to the intermediate travel time. In alternate embodiments, means for mapping comprise a computer, a workstation, or software running on any computer, or any other means that will occur to those of ordinary skill in the art. The system further comprises means for scanning for velocities based on the intermediate travel time. In alternate embodiments, means for scanning comprise a computer, a workstation, or software running on any computer, or any other means that will occur to those of ordinary skill in the art.

The example method embodiments are described for the purpose of teaching the broad aspects of the invention only. While the invention has been described with respect to a limited number of embodiments, those skilled in the art, having benefit of this disclosure, will appreciate that other embodiments can be devised which do not depart from the score of the invention as disclosed herein. Accordingly, the scope of the invention should be limited only by the attached claims.

We claim:

1. A method of migrating an input seismic data point having an input source location and an input receiver location, a scatter point, and an image location associated therewith, the method comprising:
   determining a pseudo-offset, the pseudo offset including a pseudo source location and a pseudo receiver location; and
   mapping the seismic data point to the image location based at least in part on the pseudo-offset.

2. The method of claim 1, wherein said pseudo-source location and said pseudo-receiver location are not collocated.

3. The method of claim 2, wherein said pseudo-offset further comprises a distance between the pseudo-source location and the image location plus a distance between the pseudo-receiver location and the image location.

4. The method of claim 1, further comprising determining a pseudo ray parameter.

5. The method of claim 4, wherein said pseudo ray parameter depends at least in part upon the ray parameter down from the input source location to the scatter point and the ray parameter up from the scatter point to the input receiver location.

6. The method of claim 5, wherein said pseudo ray parameter is constant from the pseudo-source location to the scatter point and from the scatter point to the pseudo-receiver location.

7. The method of claim 1, wherein said determining a pseudo-offset further comprises determining an input travel time associated with the input source location, the input receiver location, and the scatter point.

8. The method of claim 7, wherein said determining a pseudo-offset further comprises determining a pseudo travel time from the pseudo-source location to the pseudo-receiver location via the scatter point.

9. The method of claim 8, wherein the pseudo travel time and the input travel-time are essentially equivalent.

10. The method of claim 1, further comprising migration stacking.

11. The method of claim 10, wherein said migration stacking further comprises determining a moveout travel time.

12. The method of claim 11, further comprising summing the data point along the moveout travel time.

13. The method of claim 11, wherein said moveout travel time is essentially same as the pseudo travel time.

14. A method of migration of a seismic data point having an input source location, an input receiver location, and a scatter point associated therewith, the method comprising:
   determining a projected source location;
   determining a projected receiver location;
   mapping the seismic data point from an input travel time to a projected travel time;
   determining a pseudo-offset based on the projected travel time; and
   mapping the data point to the pseudo-offset.

15. The method of claim 14, wherein said projected source location is essentially equivalent to the input source location.

16. The method of claim 14, wherein said projected receiver location is essentially equivalent to the input receiver location.

17. The method of claim 14, further comprising determining a raypath from said input source location to said input receiver location.

18. The method of claim 17, wherein said determining a projected receiver location further comprises determining a projected receiver location along the determined raypath.

19. The method of claim 17, wherein said determining a projected source location further comprises determining a projected source location along the determined raypath.

20. The method of claim 14, further comprising determining a pseudo-source and a pseudo-receiver.

21. The method of claim 20, wherein said pseudo-offset comprises a distance between a pseudo-source and an image location plus a distance between a pseudo-receiver and the image location.

22. The method of claim 21, further comprising determining a pseudo ray parameter.

23. The method of claim 22, wherein said determining a pseudo ray parameter further comprises determining a pseudo ray parameter dependant at least in part upon the ray parameter down from the projected source location to the scatter point and the ray parameter up from the scatter point to the projected receiver location.

24. The method of claim 23, wherein said determining a pseudo ray parameter further comprises determining a pseudo ray parameter which is constant from the pseudo-source to the scatter point and from the scatter point to the pseudo-receiver.

25. The method of claim 14, wherein said determining a pseudo-offset further comprises determining a projected travel time associated with the projected source location, the projected receiver location, and the scatter point.

26. The method of claim 25, wherein said determining a pseudo-offset further comprises determining a pseudo travel time from a pseudo-source to a pseudo-receiver via the scatter point.

27. The method of claim 26, wherein the pseudo travel time and the projected travel-time are essentially equivalent.

28. The method of claim 14, further comprising migration stacking.

29. The method of claim 28, wherein said migration stacking further comprises determining a moveout travel time.

30. The method of claim 29, further comprising summing the data point along the moveout travel time.

31. The method of claim 29, wherein said moveout travel time is essentially same as the pseudo travel time.

32. A method for performing velocity analysis on a seismic gather, the method comprising:
   computing a moveout travel time based on an initial model;
   computing an intermediate travel time;
   mapping the gather from the moveout travel time to the intermediate travel time; and scanning for velocities based on the intermediate travel time.

33. The method of claim 32, wherein the intermediate travel time comprises at least one scannable parameter.

34. A system for migrating an input seismic data point having an input source location and an input receiver location, a scatter point, and an image location associated therewith, the system comprising:

means for determining a pseudo-offset the pseudo offset including a pseudo source location and a pseudo receiver location; and means for mapping the seismic data point to the image location based at least in part on the pseudo-offset.

35. The system of claim 34, further comprising means for determining a pseudo ray parameter.

36. The system of claim 34, further comprising means for migration stacking.

37. A system for migration of a seismic data point having an input source location, an input receiver location, and a scatter point associated therewith, the system comprising:

means for determining a projected source location;

means for determining a projected receiver location;

means for mapping the seismic data point from an input travel time to a projected travel time;

means for determining a pseudo-offset based on the projected travel time; and means for mapping the data point to the pseudo-offset.

38. The system of claim 37, further comprising means for determining a raypath from said input source location to said input receiver location.

39. The system of claim 37, further comprising means for determining a pseudo ray parameter.

40. The system of claim 37, further comprising means for migration stacking.

41. A system for performing velocity analysis on a seismic gather, the system comprising:

means for computing a moveout travel time based on an initial model;

means for computing an intermediate travel time;

means for mapping the gather from the moveout travel time to the intermediate travel time; and means for scanning for velocities based on the intermediate travel time.

* * * * *